United States Patent [19]

Nakano

[11] 4,317,172

[45] Feb. 23, 1982

[54] ELECTRONIC CASH REGISTER

[75] Inventor: Shuji Nakano, Takatsuki, Japan

[73] Assignee: Omron Tateisi Electronics Co., Japan

[21] Appl. No.: 199,650

[22] Filed: Oct. 22, 1980

[30] Foreign Application Priority Data

Oct. 24, 1979 [JP] Japan ................................ 54-137919

[51] Int. Cl.³ ........................ G06F 15/02; G06F 15/20
[52] U.S. Cl. ..................................... 364/405; 364/900
[58] Field of Search ............... 364/404, 405, 709, 710, 364/900

[56] References Cited

U.S. PATENT DOCUMENTS

| 4,003,030 | 1/1977 | Takagi et al. | 364/900 |
| 4,075,696 | 2/1978 | Shinoda et al. | 364/709 |
| 4,186,439 | 1/1980 | Shimura et al. | 364/405 |
| 4,213,179 | 7/1980 | Hamano et al. | 364/405 |

Primary Examiner—Felix D. Gruber
Assistant Examiner—Gary Chin
Attorney, Agent, or Firm—Staas & Halsey

[57] ABSTRACT

An electronic cash register comprises a key cylinder switch for selecting a registration mode for registering the price information of the commodities and a calculation mode for withdrawing the information as registered, a first and second memories, a printer, and a printer control means for controlling the printer. The first memory comprises storing regions for accumulatively storing the total amount information of the prices of the commodities for each of the respective commodity department codes registered in the registering mode. The second memory comprises storing regions for storing the outputting order of the total amount information for each of the respective commodity department codes. The printer control means is responsive to the first and second memories to control the printer to print out the total amount information for each of the commodity department codes stored in the first memory in the outputting order stored in the second memory. Preferably, the second memory also comprises further storing regions for storing group identifying information identifying any one of a plurality of groups in which the plurality of commodity department codes are classified depending on the nature of the commodities. The printer control means also functions to evaluate a subtotal of the prices of the commodities for each of the groups and controls the printer to print out also the subtotal for each of the groups.

5 Claims, 10 Drawing Figures

FIG.5A

SET 21 IN P MODE

| 1 | 6 | 11 | ST |

| 2 | 7 | 12 | ST |

| 3 | 8 | 13 | ST |

| 4 | 9 | 14 | ST |

| 5 | 10 | | ST |

| 15 |

| CA |

FIG.5B

| ADDRESS | COMMODITY DEPARTMENT CODE IN PRINTING ORDER | GROUP IDENTIFICATION |
|---|---|---|
| 0 | 1 | 0 |
| 1 | 6 | 0 |
| 2 | 11 | 1 |
| 3 | 2 | 0 |
| 4 | 7 | 0 |
| 5 | 12 | 1 |
| 6 | 3 | 0 |
| 7 | 8 | 0 |
| 8 | 13 | 1 |
| 9 | 4 | 0 |
| 10 | 9 | 0 |
| 11 | 14 | 1 |
| 12 | 5 | 0 |
| 13 | 10 | 1 |
| 14 | 15 | 0 |

FIG.6A

SET 21 IN $^X/_E$ MODE

```
DEPT     1    1   1 0 0
         6    2   6 0 0
        11    0       0

SUBTTL            7 0 0    ← GROUP SUBTOTAL

DEPT     2    1   2 0 0
         7    0       0
        12    0       0

SUBTTL            2 0 0    ← GROUP SUBTOTAL

DEPT     3    0       0
         8    0       0
        13    0       0

SUBTTL                0

DEPT     4    0       0
         9    0       0
        14    0       0

SUBTTL                0

DEPT     5    0       0
        10    0       0

SUBTTL                0

DEPT    15    0       0
```

NUMBER OF REGISTERING TIMES    TOTAL AMOUNT

ELECTRONIC CASH REGISTER

BACKGROUND OF THE INVENTION

1. Field of the Invention

The present invention relates to an electronic cash register. More specifically, the present invention relates to an improved electronic cash register adapted to collect and print information for each of the commodity departments in any sequence in spite of the order of the commodity department codes in the case where information of each of the commodity departments of commodities as individually registered is accumulated and printed.

2. Description of the Prior Art

Electronic cash registers have been generally put into practical use in supermarkets, department stores and the like. A typical conventional electronic cash register comprises a memory including a number-of-times storing region for storing the number of times of registration for each of the commodity department codes and a total storing region for storing the total amount of the registered amounts for each of the commodity department codes, for the purpose of collecting information concerning the sales amount on a day after the end of the business hours of the day, so that the number of times of registration and the total amount for the day for each of the commodity department codes are stored based on the commodity department codes of the commodities each time each commodity is registered. Then, after the shop is closed, the number of times of registration and the total amount for each of the commodity department codes are in succession printed in the order of the commodity department codes stored in the memory, so that an aggregate report is prepared. Therefore, the order of printing in the report is determined by the order of the numbers of the commodity department codes fixedly set in advance by the address order of the memory. Generally, the addresses of the memory are determined in the order of arrangement of the commodity department keys for entering the commodity department codes. Therefore, the problem involved is that in the case where the order of printing on the occasion of printing out an aggregate report is fixedly determined in association with the order of arrangement of the commodity department keys the order of printing for the respective commodity department codes can not be changed. In particular, in selling seasonal commodities, the commodity department keys corresponding to the commodity department codes allotted to the commodities are often changed depending on the seasons and the above described problem is aggravated when it is desired to change the order of printing for the respective commodity department codes.

As described briefly in the foregoing, generally, commodity department codes have been predetermined and allotted to the respective commodities being sold in a supermarket and the like. Such commodities are some times classified depending on the nature, such as the attribute, the date of purchase or the like, irrespective of different commodity department codes. For example, in the case where the commodities are foods, the foods can be classified into fresh foods, confectioneries, or the like. In such a case, it would be convenient when making a purchase, for example, if the information could be printed out while the commodities are grouped in accordance with the classification depending on the nature of the commodities, for example, irrespective of different commodity department codes.

However, in a conventional electronic cash register, usually the arrangement of the commodity department keys is determined such that those keys corresponding to the commodity department codes of the commodities which have good sales are positioned so as to be most easily operable and those keys corresponding to the commodity department codes of the commodities which have poor sales are positioned at the positions of less easy operability. In other words, the arrangement of the commodity department keys has been determined without regard to the classification of the commodities depending on the nature or the like. Therefore, if and when the total amount information corresponding to each of the commodity department codes is stored in the memory in the order of arrangement of the commodity department keys, the order of printing of the respective commodity department codes being printed out on an aggregate report becomes irregular irrespective of the classification, and inconvenience is caused in preparing a daily journal based on the aggregate report for controlling the purchase of the commodities. Accordingly, in printing out the total amounts of the respective commodity department codes and the like in an aggregate report, it is desired that such data be printed out while the same are grouped in accordance with the classification of the commodities depending on the nature, for example, by making the printing order not associated with the arrangement of the commodity department keys.

SUMMARY OF THE INVENTION

Accordingly, an object of the present invention is to provide an electronic cash register in which the order of printing the data for each of the commodity department codes can be determined by an arbitrary order in the case where the total amount and the like are printed separately for each of the commodity department codes.

Another object of the present invention is to provide an electronic cash register wherein the data of the commodities associated with each other in nature can be printed in a group by grouping the commodity department codes of the commodities which are associated with each other in nature.

A further object of the present invention is to provide an electronic cash register wherein the subtotal for each group of the commodities associated with each other in nature can also be printed in the case where the data is printed by grouping the commodity department codes of the commodities which are associated with each other in nature.

In summary, the present invention comprises: first storage means for storing the total amount for each of the commodity department codes; and second storage means for storing the order of printing of the total amount of each of the commodity department codes in association with the first storage means, whereby in preparing an aggregate report the data is printed in the desired order of the commodity department codes, by controllably reading the total amount information for each of the commodity department codes stored in the first storage means based on the data for the order of printing stored in the second storage means.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 5A is a view showing an example of manual operations in the case where the commodity department codes are set in the order of printing;

FIG. 5B is a view showing a table portion as set;

FIG. 6A is a view diagrammatically showing an example of manual operations in the case of printing in an aggregate manner; and FIG. 6B is a view diagrammatically showing one example of a print out format as printed out in an aggregate manner.

DESCRIPTION OF THE PREFERRED EMBODIMENTS

In the following, a specific embodiment of the present invention will be described with reference to the drawings.

Figure 1:
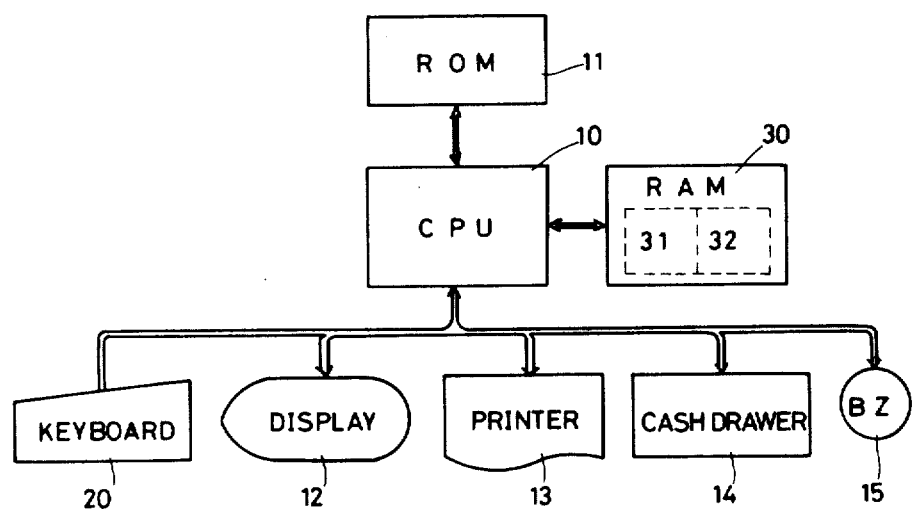
FIG. 1 is a block diagram of one embodiment of the present invention.

FIG. 1 is a block diagram showing an outline of one embodiment of the present invention. An electronic cash register of the embodiment shown comprises a central processing unit 10 which is an example of an arithmetic processing means, a read only memory 11 for storing in advance an operation program for the processing operation by the central processing unit 10, a display 12, a printer 13, a cash drawer 14, a buzzer 15, a keyboard 20 to be described in detail subsequently with reference to FIG. 2, and a random access memory 30 including a memory portion 31 for storing information for the respective commodity departments and a table portion 32 for storing the printing order, which portions are readable and writable with data.

Figure 2:
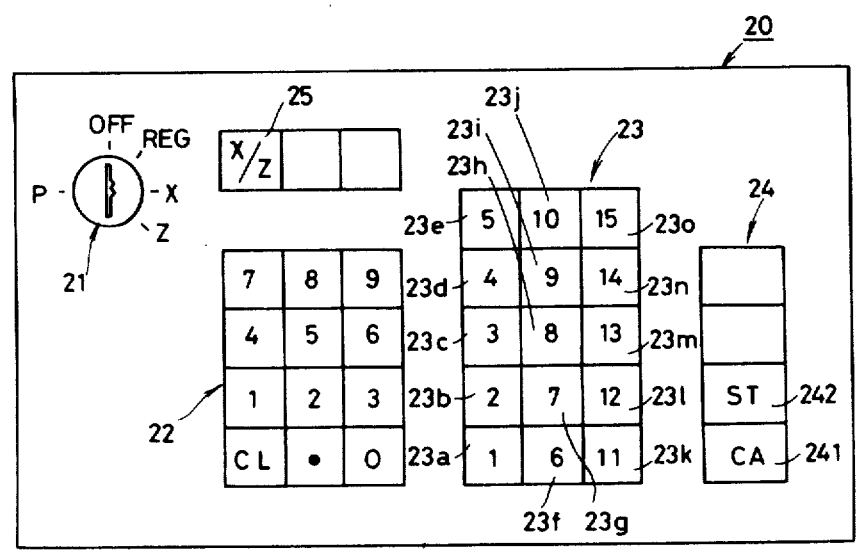
FIG. 2 is a specific diagrammatic view of a keyboard.

FIG. 2 is a specific diagrammatic view of the above described keyboard 20. Referring to FIG. 2, the keyboard 20 comprises a mode selecting key cylinder switch 21 for selecting the operation modes, numeral keys 22 for entering numerical value information by the numerals 0, 1, 2, ..., 9 and a decimal point, a commodity department key group 23 including commodity department keys 23a to 23o for entering the commoditiy department codes corresponding to the commodities of the price or amount information entered by the numeral keys 22, function keys 24 including a total key 241 and a subtotal key 242, and a report key 25 for commanding preparation of a calculation report, all of which are disposed on an operation panel.

The above described key cylinder switch 21 comprises a position OFF for prohibiting an operation, a position P for a setting mode for entering the order for printing of the commodity department codes, a position REG for an ordinary registration processing mode, a position X for a printing mode by an operator, and a position Z for a mode for commanding a printing operation that can be allowed only by a specified supervisor, whereby the desired operation can be selected depending on the mode selected positions of the key cylinder switch 21.

Figure 3:
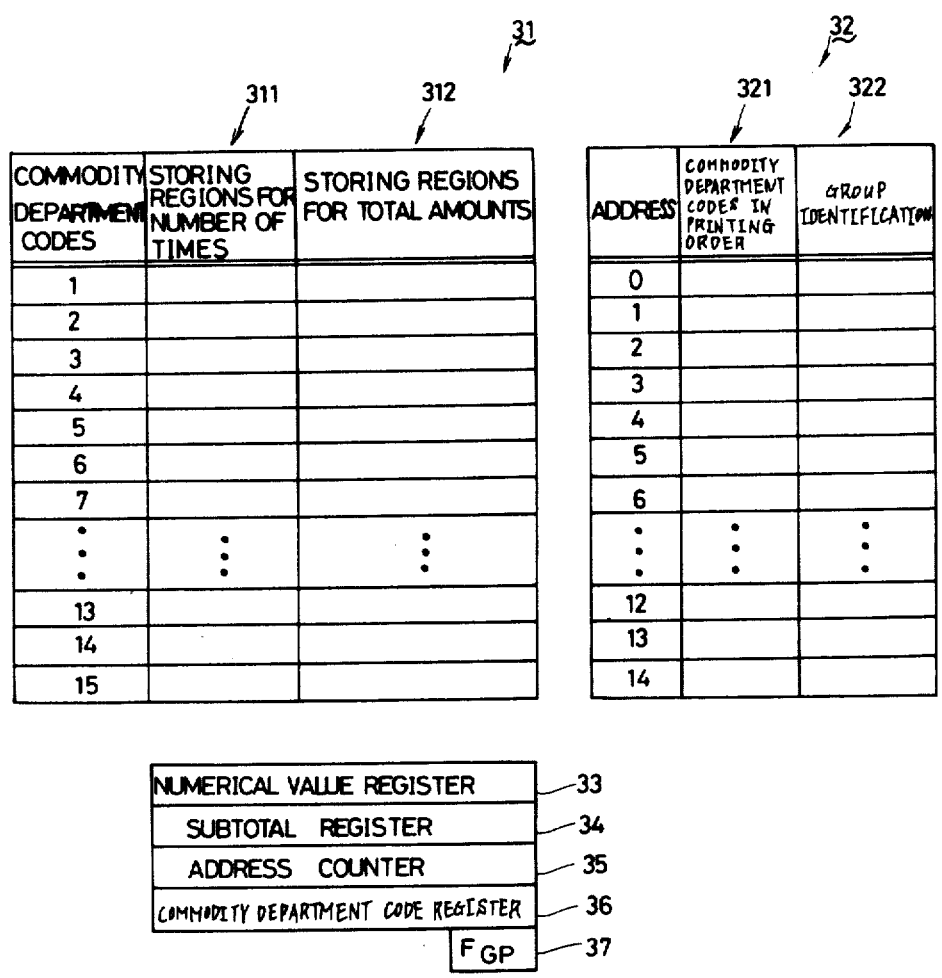
FIG. 3 is a view diagrammatically showing the storing regions of a random access memory.

FIG. 3 is a view diagrammatically showing storing regions in the above described random access memory 30, which comprises a memory portion 31 for storing the information for the respective commodity departments and a table 32 for storing the commodity department codes in the order of the printing. The memory portion 31 comprises storing regions 311 for storing the number of times of registration for each of the commodity department codes (the commodity department codes 1 to 15 in the embodiment shown), and total storing regions 312 for storing the information concerning the total amount of the registrations for each of the commodity department codes. The table portion 32 comprises storing regions 321 for storing the commodity department codes in the order of printing in the address order, and storing regions 322 for storing information for identifying the groups of the commodity department codes associated with each other in nature in correspondence to the commodity department codes in the order of printing. The storing regions 322 each comprise a storing region of one bit, for example, so that the information for identifying the group is stored by the logic zero or one under the convention that the logic zero is stored in the case where the data of the same group continues, whereas the logic one is stored in the address corresponding to the last commodity department code of the same group, whereby the present and past commodity department codes are identified as of the same group in storage.

The random access memory 30 further comprises a numerical value register region 33 for storing numercial value information entered by the above described numeral keys 22, a subtotal register region 34 for storing subtotal information for each group, an address counter region 35, a commodity department register region 36 for storing commodity department codes, and a flag region 37 for storing a flag or group identifying information FGP.

Figures 4, 4A:
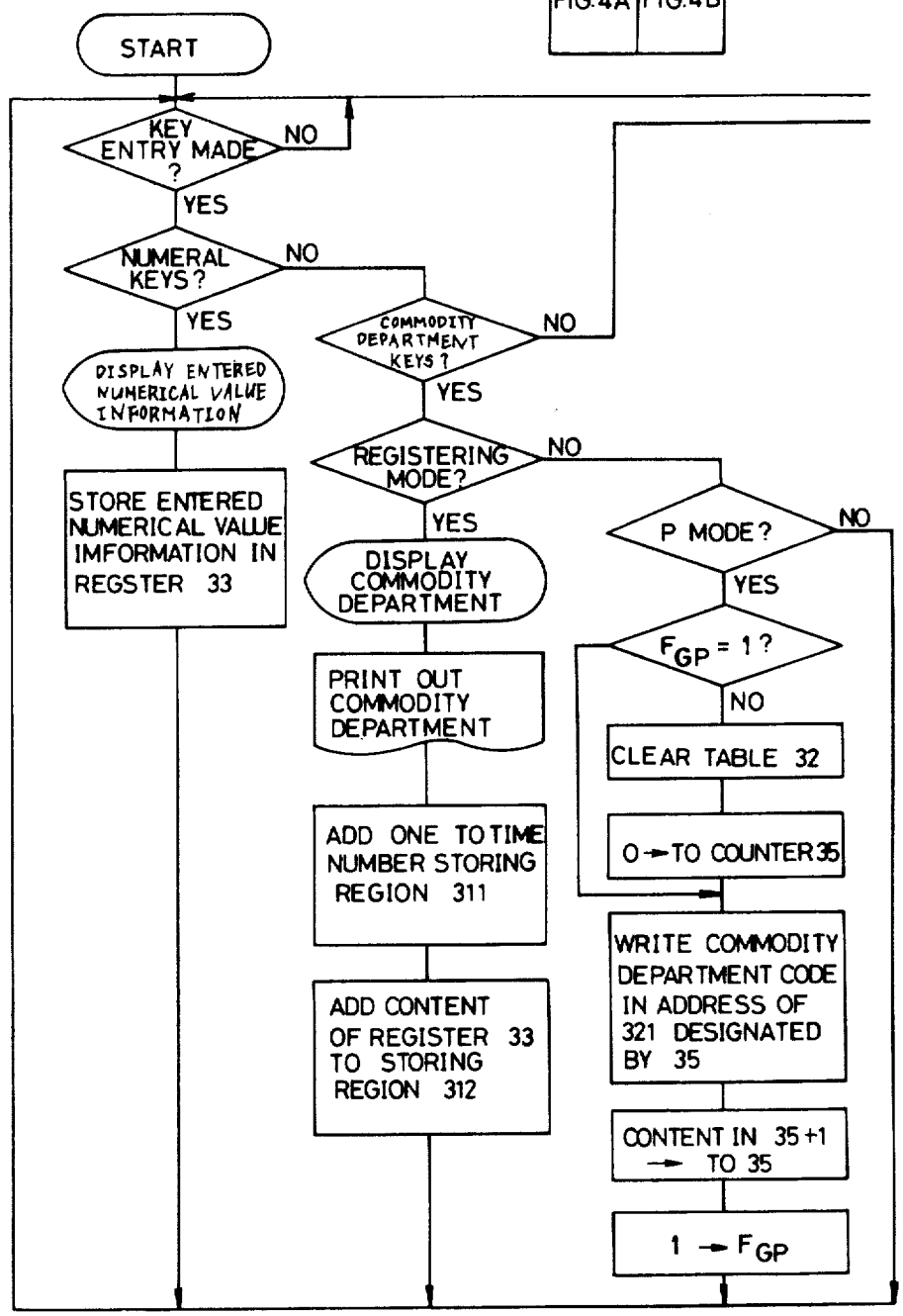
FIG. 4, including 4A–4B, is a flow chart showing one embodiment of the present invention.
Figure 4B:
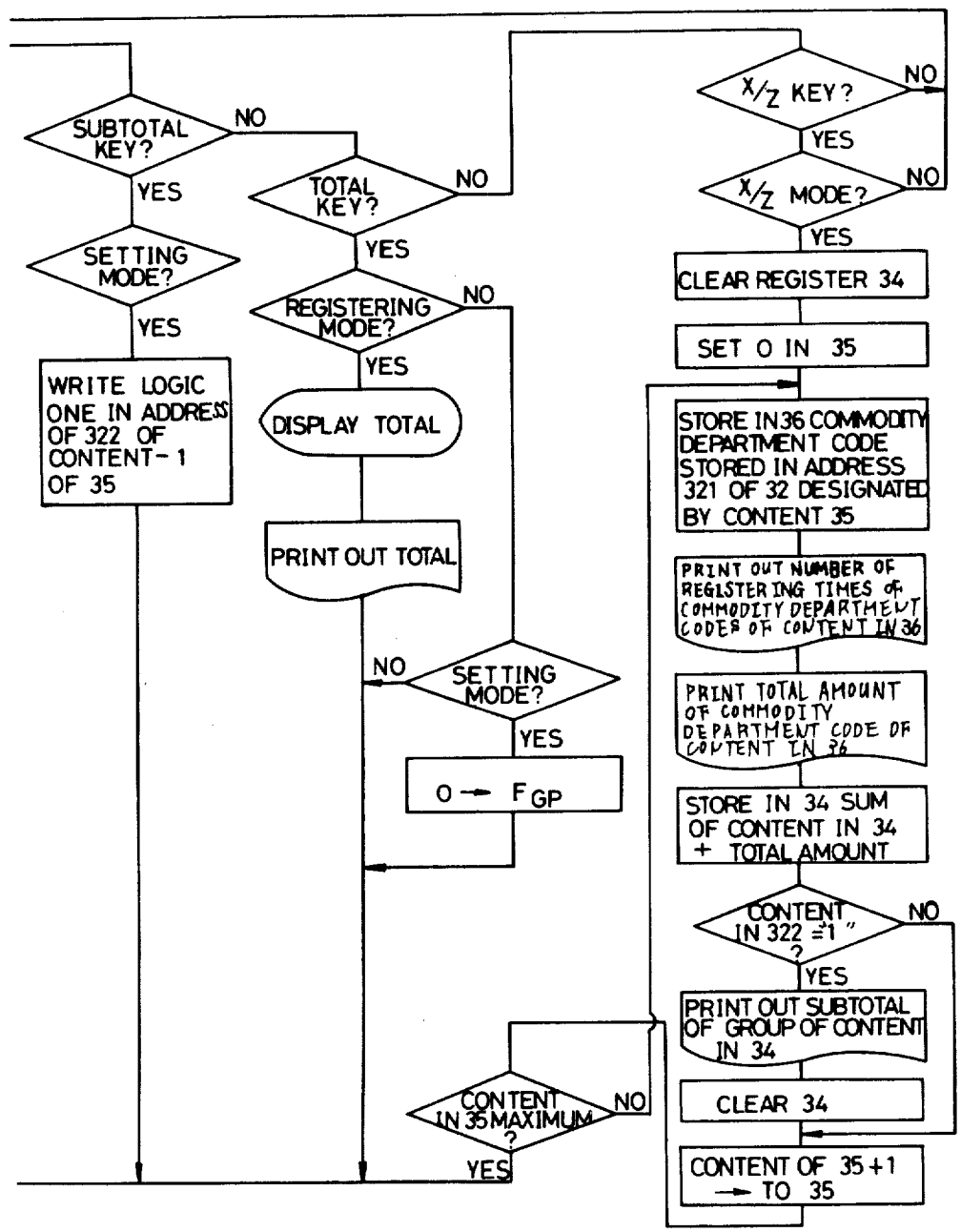

FIG. 4 is a flow diagram depicting the operation of the present invention.

FIG. 5A shows an example of a series of key operations for entering the commodity department codes in the order of printing into the above described table portion 32 and FIG. 5B diagrammatically shows the state of the table portion 32 in which the commodity department codes have been written in the order of printing in such case.

Now referring to FIGS. 1 to 5B, description will be made of a case where the commodity department codes in the order of printing are entered in the table portion 32. First of all the above described key cylinder switch 21 is operated to select the setting mode position P and then the above described commodity department keys 23 are operated to enter the commodity department codes and the group identifying information in the order of printing. For example, assuming a case where the total amount information corresponding to each of the commodity department codes and the number of times of registrations are to be printed in the order of the commodity department codes 1, 6 and 11, for example; and after the end of printing of the total amount information for each of the commodity department codes in the first group, the total amount of the respective commodity department codes included in the first group is to be printed, then entry is made in the following manner. More specifically, the commodity department codes of the order of printing are entered in the order of the commodity department keys 23a, 23f, and 23k, i.e. $\boxed{1}$, $\boxed{6}$, and $\boxed{11}$, and then the subtotal key 242 is depressed. Considering a case where first the commodity department key 23a is depressed, the central processing unit 10 is responsive to the key entry and determines that the key entry is not one of the numeral keys but one of the commodity department keys and that the position of the key cylinder switch 21 is not in the registration mode REG but in the setting mode P, whereupon the central processing unit enters into the setting mode for the order of printing for each of the commodity department codes. More specifically, the central processing unit 10 determines whether the flag FGP stored in the flag region 37 for indicating that the central processor is in the process of storing the data for the printing order of the commodity department codes is the logic one; however, since the flag FGP stored in the flag region 37 is the logic zero at the beginning, all the storing regions in the table portion 32 are cleared and then the contents in the address counter region 35 for designating the addresses of the table portion 32 is turned to zero. Then the central processing unit 10 is responsive to the key code of the commodity department key 23a and stores the commodity department code, say 1, thereof in the storing region 321 of the table portion 32 of the address, say the address 0, designated by the address counter region 35. Then the address counter region 35 advances the count value by one so that the address of the table portion 32 where the following data is to be loaded is designated and then the logic one is written in the flag region 37 and the central processing unit 10 returns again to the key entry standby operation.

When the commodity department key 23f is then depressed, the central processing unit 10 is reponsive to the key entry, thereby determines that the key entry is not one of the numeral keys but one of the commodity department keys and determines that the selected position of the key cylinder switch 21 is not in the registration mode REG but in the setting mode P. Thereafter the central processing unit 10 determines that the flag FGP in the flag region 37 is the logic one. The central processing unit 10 is then responsive to the key code of the commodity department key 23f and stores the commodity department code 6 in the storing region 321 of the table portion 32 of the address, say address 1, designated by the count value of the address counter region 35.

Upon depression of the commodity department key 23k, likewise the commodity department code 11 corresponding to the commodity department key 23k is stored in the address 2 of the table portion 32.

Thereafter, upon depression of the subtotal key 242 by an operator, the central processing unit 10 is responsive to the key entry and determines that the same is not one of the numeral keys nor one of the commodity department keys but the subtotal key and, if the selected position by the key cylinder switch 21 at that time is the setting mode, the logic one is loaded in the storing region 322 of the table portion 32 of the address, say 2, designated by the value subtracted by one from the count value in the address counter region 35. Thus, those commodity department codes stored in the address 0 to the address 2 in the table portion 32 can be identified to be of the same group.

Likewise thereafter, those commodity department keys which an operator desires to print in a desired order are depressed in such order and each time the end of the group of the commodity department codes corresponding to such commodity department keys is reached the subtotal key is depressed. As a result, it follows that the commodity department codes and the information identifying the groups are loaded in the order of printing as shown in FIG. 5B.

When the order of printing of all the commodity department keys being used is entered through the keying operation, then finally the total key 241 is depressed. The central processing unit 10 is responsive to depression of the total key 241 and stores the logic zero in the above described flag region 37 based on the fact that the central processing unit is not in the registration mode but in the setting mode, thereby terminating the entering operation for the order of printing of the commodity department codes and the group identifying information.

Now the registration mode will be described. In the case of the registration mode, the operator selects the position REG for the registration mode on the above described key cylinder switch 21 and then operates the numeral keys 22 to enter the unit prices of the commodities and operates the commodity department keys 23a to 23o to enter the commodity department codes of these commodities. Considering a case where the unit prices of the commodities purchased by a customer are key entered through operation of the numeral keys 22, the central processing unit 10 is responsive to the key entry and determines that the key entry is of the numeral keys, thereby displaying the unit price information on the display 12 and storing the same in the numerical value register region 33. Upon depression of the commodity department key 23, the central processing unit 10 is responsive to the key entry, and determines that the key entry is not one of the numeral keys but one of the commodity department keys and, based on the fact that the selected mode of the selected position on the key cylinder switch 21 is the registration mode, the commodity department code corresponding to the depressed commodity department key is displayed on the display 12, whereby the above described commodity department code and the unit price are printed by the printer 13. The numercial value one is added to the number of times of registration so far attained and the total is stored in the registration time number storing region 311 corresponding to the above described commodity department code, whereby a new number of times of registrations is generated, which is renewably stored in the registration time number storing region 311. Furthermore, the central processing unit 10 generates a new total amount by adding the unit price now key entered, i.e. the unit price stored in the numerical value register region 33, to the total amount so far stored in the total amount storing region 312 corresponding to the commodity department code as designated, and stores the new total amount in the total amount storing region 312 corresponding to the above described commodity department code. Thus, each time each commodity is registered, the number of times of registrations and the total amount information are stored in the storing regions 311 and 312, respectively.

Each time each commodity is registered, the number of times of registrations corresponding to the commodity department code as registered and the total amount information are each accumulated in the same manner as that of the previously described operation and then, upon depression of the total key 241, the central processing unit 10 is responsive to the fact that the key entry is not one of the numeral keys, nor one of the commodity department keys, nor the subtotal key but the total key and that the operation mode is the registration mode to accumulate the registered amount of the same customer now in registration, thereby displaying the total amount by the display 12 and printing the total amount by the printer 13. Thus, the ordinary registration mode is completed.

Now description will be made of an operation of the present invention in the case where, after the end of business for one day, the number of times of registrations for each of the commodity department codes and the total amount information stored in the memory 31 are aggregated for reporting.

FIG. 6A is a diagrammatic view showing an example of manual operation and FIG. 6B is a diagrammatic view showing a printing format in the case of printing the aggregate data, which constitute one feature of the present invention. Now referring to FIGS. 6A and 6B as well as FIGS. 1 to 4, an operation in the case where the aggregate report is printed in accordance with the order of printing for each of the commodity department codes set in advance in the table 32 will be described.

In the case of printing a report, an operator first turns the key cylinder switch 21 to either registration mode position X or Z. Then a printing operation is commanded by depressing the report key 25. As the report key 25 is operated, the central processing unit 10 is responsive to the key entry and determines that the key entry is not one of the numeral keys, nor one of the commodity department keys, nor the subtotal key 242, nor the total key 241 but the report key 25, and also determines whether the mode selected by the key cylinder switch 21 at that time is either the registration mode X or Z. Since the key cylinder switch 21 has been turned to either position X or Z, it is determined that the operation mode is the registration mode and then the central processing unit proceeds to the aggregate printing operation. More specifically, after the central processing unit 10 clears the content in the subtotal register region 34, the same loads zero, i.e. clears, into the address counter region 35. The central processing unit 10 reads out the commodity department codes stored in the address, which is the address 0 at the beginning, of the table portion 32 designated by the count value of the address counter region 35 and stores the same in the commodity department code register region 36; and then reads out the number of registering times and the total amount information in the address of the memory portion 31 corresponding to the commodity department code stored in the commodity department code register region 36, thereby printing out the same. Furthermore, the central processing unit adds the total amount information now read out and the contents in the register region 34 (which is zero at the beginning), and stores the sum thereof renewably in the register region 34. Thereafter, the central processing unit 10 determines whether the group identifying information stored in the storing region 322 of the table portion 32 designated by the address counter 35 is the logic one, and thus determines whether the this is the final commodity department code of the group. If the group identifying information is determined as not the logic one at that time, then the central processing unit 10 advances the count value of the address counter region 35 by one, thereby designating the next address of the table portion 32, and then determines whether the count value in the address counter region 35 has reached the maximum number address of the table portion 32. If the maximum address number has not been reached, the central processing unit 10 returns to the reading operation for the commodity department code of the table portion 32 as addressed.

Likewise thereafter, the central processing unit 10 reads out the commodity department code, say 6, stored in the address, say address 1, of the table portion 32 designated by the address counter region 35; then stores the same in the commodity department code register region 36, and reads out the number of registering times stored in the storing region 311 corresponding to the commodity department code stored in the register region 36, and prints the same by the printer; and then reads out the total amount information stored in the storing region 312 corresponding to the commodity department code, and prints the same by the printer 13. Thereafter the central processing unit adds the total amount information now read out and the amount information stored in the register region 34, and renewably stores store the sum in the register region 37. Thereafter the central processing unit determines whether the group identifying information stored in the storing region 322 of the table portion 32 designated by the address counter region 35 is the logic one and, if the group identifying information is not determined to be the logic one, the central processing units advances the count value of the address counter region 35 by one, whereupon the above described operation is repeated.

In the same manner as that of the previously described operation, when the address counter region 35 designates the address 2 of the table portion 32, the number of registering times and the total amount information corresponding to the commodity department code 11 stored in the address number 2 are printed out; and upon determination that the group identifying information stored in the storing region 322 is the logic one, the information of all the total amounts of the first group, i.e. the commodity department codes 1, 6 and 11, so far stored in the register region 34 is supplied to the printer 13 and printed out. Thereafter the register region 34 is cleared and again the address counter region 35 is advanced to a new count value. The above described operation is repeated, until the count value in the address counter region 35 reaches the maximum address number of the table portion 32. When the count value of the address counter region 35 becomes the maximum address number of the table portion 32, the central processing unit returns to the key entry standby operation; however, if the Z mode has been selected at that time, the central processing unit clears the content in the memory portion 31 and returns to the key entry standby operation. The print out format is thus printed in a report form in the above described manner is shown in FIG. 6B.

Thus, since the embodiment shown is such that the total amount information and the number of registering times are stored in the memory for each of the commodity department codes and the order of printing thereof is set and stored in the table portion 32, an advantage is brought about that in spite of the order of the commodity department codes stored in the memory portion 31 the data is aggregated and printed in the order of the commodity department codes as stored in the table portion 32. Furthermore, when the group identifying information is stored in the table portion 32 in accord with the commodity department code or the order of printing another advantage is brought about in that the total amount information for each of the commodity in the same group unit can be calculated with ease while the total amount of the commodity department codes associated with each other in nature can also be known. Since the setting of the commodity department codes in the order of printing in the table portion 32 can be changed, a further advantage is brought about in that the total amount information and the number of registering times can be aggregated and printed out for each of the commodity department codes in a desired order in spite of an arrangement of the keys in the keyboard.

Thus, according to the present invention, unique meritorious effects are brought about in that the order of printing for each of the commodity department codes can be properly changed and set and the data can be printed out collectively in groups of those commodity department codes associated with each other in nature in spite of an increased number of commodity department codes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register having a first mode for entry of registering information and a second mode for withdrawal of said registering information, comprising:

information entry means for entry of registering information including information concerning a price of a commodity being sold and a commodity department code representing a commodity department of said commodity being sold;

mode selecting means for selecting either said first mode for entry of said registering information by means of said information entry means or said second mode for withdrawal of said registering information registered in said first mode;

first storage means including a plurality of storing regions corresponding to a plurality of commodity department codes and responsive to said mode selecting means, for accumulating and storing, while in said first mode, in each of the respective storing regions the information concerning a total amount of the prices of the commodities for each of said commodity department codes obtained through accumulation of said information entered by said information entry means concerning the price of the commodity separately for each said commodity department code;

second storage means including a plurality of storing regions corresponding to said plurality of commodity department codes, for storing in advance a desired outputting order of said information concerning a total amount of the prices of the commodities for each of said commodity department codes to be outputted, which is stored in each of said storing regions of said first storage means;

representation means for visibly representing said information concerning said total amount for each of said commodity department codes stored in said first storage means; and output control means responsive to said mode selecting means for providing in succession in said second mode said information concerning said total amount for each of said commodity department codes stored in said first storage means to said representation means in said outputting order of the respective commodity department codes stored in said second storage means.

2. An electronic cash register in accordance with claim 1, wherein said representation means comprises printing means for printing out said information concerning said total amount for each of said commodity department codes in said outputting order of the respective commodity department codes.

3. An electronic cash register in accordance with claim 1, wherein said plurality of commodity department codes have been classified in advance into a plurality of groups depending on mutual association with each other of the respective commodities of said plurality of commodity department codes; and said second storage means further comprises group identifying information storing regions for storing group identifying information for identifying the group of each of said plurality of commodity department codes.

4. An electronic cash register in accordance with claim 3, wherein said output control means comprises operation means responsive to said group identifying information stored in said group identifying information storing regions for evaluating information concerning a subtotal amount of the prices of said commodities of said commodity department codes classified in the same group;

said representation means is adapted to further represent visibly said information concerning said subtotal amount of the prices of the commodities of said commodity department codes classified in the same group; and said output control means is adapted to provide to said representation means said information concerning said subtotal amount of the prices of the commodities of said commodity department codes classified in the same group.

5. An electronic cash register in accordance with claim 1, further comprising outputting order entry means for entry of a desired outputting order of the respective commodity department codes being stored in said second storage means; and loading control means for loading said desired outputting order of the respective commodity department codes entered by said outputting order entry means in said storing regions of the corresponding commodity department codes of said second storage means.

* * * * *

UNITED STATES PATENT AND TRADEMARK OFFICE
CERTIFICATE OF CORRECTION

PATENT NO. : 4,317,172
DATED : February 23, 1982
INVENTOR(S) : SHUJI NAKANO

It is certified that error appears in the above—identified patent and that said Letters Patent is hereby corrected as shown below:

```
Column 1, line 61, "irrespecive" should be --irrespective--.
Column 6, line 56, after "the" insert --new--;
          line 57, after "the" insert --new--.
Column 7, line 58, delete first occurrence of "the".
Column 8, line 18, delete "store";
          line 64, "or" should be --for--;
          line 66, "commodity" should be --commodities--.
```

Signed and Sealed this

Eighth Day of June 1982

|SEAL|

Attest:

Attesting Officer

GERALD J. MOSSINGHOFF

Commissioner of Patents and Trademarks